United States Patent [19]  [11] 4,110,015
Reddy  [45] Aug. 29, 1978

[54] ELECTROLYTES FOR USE IN ELECTROCHROMIC DEVICES

[75] Inventor: Thomas B. Reddy, Pound Ridge, N.Y.

[73] Assignee: American Cyanamid Company, Stamford, Conn.

[21] Appl. No.: 800,362

[22] Filed: May 25, 1977

[51] Int. Cl.$^2$ ............................................. G02F 1/36
[52] U.S. Cl. ................................. 350/357; 252/500; 252/518; 252/408
[58] Field of Search ................ 350/357; 252/408, 518, 252/500

[56] References Cited

U.S. PATENT DOCUMENTS

| | | | |
|---|---|---|---|
| 3,451,741 | 6/1969 | Manos | 350/357 |
| 3,704,057 | 11/1972 | Beegle | 350/357 |
| 3,708,220 | 1/1973 | Meyers et al. | 350/357 |
| 3,806,229 | 4/1974 | Schoot et al. | 252/408 |
| 3,807,832 | 4/1974 | Castellion | 350/357 |
| 3,827,784 | 8/1974 | Giglia et al. | 350/357 |
| 3,839,857 | 10/1974 | Berets et al. | 350/357 |
| 3,879,108 | 4/1975 | Berets | 350/357 |

Primary Examiner—Benjamin R. Padgett
Assistant Examiner—T. S. Gron
Attorney, Agent, or Firm—Bruce F. Jacobs

[57] ABSTRACT

Improved electrolytes for use in electrochromic devices are disclosed. These electrolytes are prepared by the incorporation of a lithium salt in a solvent selected from dimethylsulfite, nitromethane, and sulfolane.

7 Claims, No Drawings

ELECTROLYTES FOR USE IN ELECTROCHROMIC DEVICES

This invention relates to improvements in electrooptical devices which contain a layer of persistent electrochromic material on one electrode in contact with a specific liquid electrolyte solution which in addition contacts a counter-electrode in the device. These devices are operated by a flow of electric current between the electrodes through said electrolyte solution. They are provided with means for applying an electric field to said electrodes and with means for reversing the polarity of the respective electrodes to reverse the electric field and thereby change the photo-absorptive characteristics of the electrochromic layer.

A variety of such devices having numerous uses have been described in the prior art. U.S. Pat. No. 3,708,220 for example, describes electrochromic devices of the kind referred to in which a particular gelled electrolyte solution is used. The invention is useful for a variety of electrochromic devices for digital displays and other image displays, and for variable light transmission applications such as electrochromic windows, mirrors, and the like.

In a typical device embodying the present invention a film of a selected persistent electrochromic material is coated on the surface of an electron-conductive electrode which usually is a plate which may be conductive glass, metal, a carbon plate, or the like. The electrode having the layer of electrochromic material usually will be one wall of a container for the liquid electrolyte solution, and the electrochromic layer contacts the electrolyte solution in the container. A counter-electrode is spaced apart from the electrochromic layer, across the container from the electrochromic layer, and a liquid electrolyte solution is in the compartment. When an electric field is applied to the electrodes, electric current flows through the electrolyte solution, between the electrochromic layer and the counter-electrode, causing either coloration or bleaching of the electrochromic material. The devices are provided with means for selectively changing the polarity of the electrodes to provide, alternatively, for coloration at one polarity and for bleaching at the opposite polarity.

The present invention is directed specifically to the composition of novel electrolyte solutions which will be useful in any of the several devices of the kind described. The invention provides such devices with improved electrolyte solutions having an aprotic organic solvent selected from dimethylsulfite, nitromethane and sulfolane. U.S. Pat. No. 3,704,057 describes electrochromic devices containing electrolyte solutions with salts of alkali metals or rare earth metals dissolved in organic solvents. More specifically, a salt such as lithium perchlorate, lithium nitrate, lithium chloride, lithium sulfate, or the like was dissolved in propylene carbonate or acetonitrile.

While any of a number of aprotic organic liquids can theoretically be used as the electrolyte solvent in such devices, several important functions of the electrochromic devices vary significantly depending on the particular organic solvent selected. Among the functions that are so affected, the most important are (1) the speed of switching of the electrochromic layer from one state to another, (2) the intensity of color attained in the electrochromic layer, (3) the electrical potential required for bleaching the layer, and (4) the electrical efficiency of the switching operation.

By the term "switching" is meant the change of polarity of the electrodes and the resulting change in the radiation absorbing character of the electrochromic material upon the application of an electric field. The transmission of current in one direction through the device will increase the light absorptive character (color) of the layer. After the current is stopped, the same absorptivity tends to remain in the layer, i.e. the color is persistent, until current of the reverse polarity is applied whereupon the photo absorptivity of the layer decreases. The application of current in the direction which decreases absorptivity is called bleaching. The electrochromic material is persistent in both its colored and its bleached state whenever no current is being applied.

The electrolyte solutions of the present invenion, which serve to improve the lifetime and range of contrast of the electrochromic devices, compromise lithium salts dissolved in certain specified aprotic solvents. The lithium salts suitable for use herein include such as lithium perchlorate, lithium chloride, lithium nitrate, lithium bromide, $LiBF_4$, $LiAsF_6$, $Li_2CO_3$, $Li_3PO_4$, $Li_2SO_4$, and LiI. Preferably the perchlorate, chloride, nitrate, and bromides salts are used. Most preferably the salt is lithium perchlorate.

The aprotic solvents suitable for use herein are dimethylsulfite, sulfolane, and nitromethane. Each of these solvents, when combined with a lithium salt such as lithium perchlorate, yields electrolytes having a greatly reduced percentage of the charge going to side reactions as compared to the prior solvents used with lithium salts and as compared to a previous electrolyte solution of choice (Glycerin — $H_2SO_4$, 10—1 mixture). In addition these solvents each provide a good balance of the other critical properties specified above.

The electrolyte solutions may be conveniently prepared by simply placing the specified amount of the lithium salt into the solvent and then stirring the mixture. The concentration of the lithium salt solution may vary from $10^{-4}$ moles/liter to a saturated solution, though the actual concentration does not appear to be critical.

The following non-limiting examples illustrate the advantage of the specified solvents over prior art solvents as well as numerous other aprotic solvents.

EXAMPLE I

Thirteen non-aqueous aprotic solvents with lithium perchlorate dissolved in each, as well as a glycerine — $H_2SO_4$ mixture, were tested for suitability for use in electrochromic displays. The electrolyte solutions tested were prepared by starting with either spectro-quality or reagent grade solvents which were shaken overnight with freshly-fired 3A molecular sieves. In some cases the resulting solution was turbid and thus was centrifuged before use. To each solvent was added dried lithium perchlorate in sufficient amount to make a 0.1 molar solution. In some instances, as shown below in Table I, the salt was not completely soluble and the solution was saturated at a level below 0.1M.

Each of the electrolyte solutions was then incorporated into an electrochromic cell for testing purposes. Each cell consisted of three electrodes: an amorphous evaporated tungsten oxide film (1 cm. × 1 cm. × 3600 Å) on a glass slide coated with conductive tin oxide; as a counter electrode, a platinum wire in a tube designed to vent any gases formed to the atmosphere; and an isolated aqueous saturated calomel reference electrode (SCE) against which the electrode potential of the tungsten oxide electrode was controlled by a Princeton Applied Research (PAR) Model 173 Potentiostat containing PAR Model 179 Digital Coulemeter. The potentiostat was programmed by a PAR Universal Programmer (Model 175) to vary the electrode potential from (1) the initial potential ($E_i$) where no oxidation or reduction occurred to (2) the cathodic limit ($E_c$) which was $-0.600$ volts vs. SCE, at which point the current was determined. Then the direction of polarization was reversed and the potential varied up to the anodic limit ($E_a$) which was $+1.300$ volts vs. SCE at which point the current was again determined. The direction of polarization was then again reversed and varied to reach the final limit ($E_p$) which equals $E_i$. The resulting current voltage curves were recorded on a Mosely Model 2D-2AM X-Y Recorder.

Each of the electrolyte solutions tested had the electrolyte solution in contact with the electrochromic film, the counter-electrode, and the reference electrode, contact to the latter being made by means of a capillary entering the cell.

The criteria to determine the suitability of a solvent for use in electrochromic displays are (1) 100 times the ratio of the net number of coulombs passed during the scan to the greater of the anodic or cathodic coulombs passed, which gives the percent of the charge going to side reactions; (2) the current at $E_c$ ($-0.600$ volts vs. SCE), the magnitude of which indicates the intensity of coloration; and (3) the anodic peak potential, which indicates the ease of bleaching.

The electrochemical data is summarized in Table I below.

The results clearly show that dimethylsulfite, sulfolane and nitromethane each provide a greatly reduced percentage of the charge going to undesirable side reactions as compared to the prior art solvents and electrolyte systems. These solvents in addition maintain the other critical parameters at comparable levels. Thus they are especially useful in electrochromic devices, since they may be switched at higher voltages than glycerin—$H_2SO_4$ electrolytes, and are more conductive than lithium perchlorate in previous solvents.

TABLE I

Electrochemical Test Results of Example I
All Data at 25.0 mv/sec. except as noted

| Solvent | LiClO$_4$ Concentration | $\frac{Q_{net}}{Q_{max}} \times 100\%$ | Current at $E_c = -0.600$ (microamps) | Anodic Peak Potential (volts vs. SCE) |
|---|---|---|---|---|
| Dimethylsulfite | sat | 0.0049 | 315 | +0.175 |
| Sulfolane | 0.1M | 0.33 | 199 | +0.15 |
| Nitromethane | sat | 1.06 | 202 | +0.05 |
| Dimethoxyethane | 0.1M | 1.85 | 246 | +0.29 |
| Methyl formate | 0.1M | 6.32 | 141 | −0.10 |
| Pyridine | 0.1M | 8.25 | 110 | 0 |
| Diglyme | 0.1M | 8.75 | 95 | +0.175 |
| Tetrahydrofuran | 0.1M | 10.0* | 114 | +0.75 |
| Propionitrile | sat | 21.7 | 132 | −0.10 |
| Triethylphosphate | 0.1M | 40.3 | 16 | +0.90 |
| Dimethylsulfoxide | 0.1M | no data | 60 | +0.35 |
| Acetonitrile (prior art) | sat | 1.38 | 192 | +0.025 |
| Propylene carbonate (prior art) | 0.1M | 15.0 | 156 | −0.10 |
| Glycerin-H$_2$SO$_4$ (10-1) prior art solvent of Choice) | NONE | 2.65 | 285 | +0.375 |

*Data obtained at 250 mv/sec.

EXAMPLE II

The procedure of Example I is repeated except substituting the following lithium salts for the lithium perchlorate:
(1) LiCl
(2) LiNO
(3) LiBr$^3$
(4) LiBF$_4$
(5) LiAsF$_6$ Similar results to that of Example I are obtained showing the unexpected superiority of dimethylsulfite, sulfolane, and nitromethane, irespective of the actual lithium salt employed.

What is claimed is:

1. In an electrochromic device which comprises a layer of persistent electrochromic material on an electrode surface in contact with an electrolyte solution, a counter-electrode also contacting said solution and electrical means for selectively applying electrical fields of opposite polarity across said electrodes, the improvement wherein said electrolyte solution comprises a lithium salt dissolved in a solvent selected from the group consisting of dimethylsulfite, nitromethane, and sulfolane.

2. The electrochromic device as in claim 1 wherein the electrochromic material is WO$_3$.

3. The electrochromic device as in claim 1 wherein the lithium salt is selected from lithium perchlorate, lithium chloride, lithium nitrate, lithium bromide, lithium fluoroborate, and lithium hexafluoroarsenate.

4. The electrochromic device as in claim 3 wherein the lithium salt is lithium perchlorate.

5. The electrochromic device as in claim 4 wherein the solvent is dimethylsulfite.

6. The electrochromic device as in claim 4 wherein the solvent is nitromethane.

7. The electrochromic device as in claim 4 wherein the solvent is sulfolane.

* * * * *